United States Patent [19]
Medal

[11] Patent Number: 5,122,021
[45] Date of Patent: Jun. 16, 1992

[54] ENCAPSULATED FASTENER AND WASHER

[75] Inventor: James Medal, Cape Coral, Fla.

[73] Assignee: The Fastron Corporation, Franklin Park, Ill.

[21] Appl. No.: 674,763

[22] Filed: Mar. 22, 1991

[51] Int. Cl.$^5$ ............................................. F16B 19/00
[52] U.S. Cl. ..................................... 411/377; 411/369
[58] Field of Search .............. 411/377, 371, 429, 369, 411/542, 903, 368

[56] References Cited

U.S. PATENT DOCUMENTS

| | | | |
|---|---|---|---|
| 3,134,290 | 5/1964 | Jentoft | 411/377 |
| 3,592,100 | 7/1971 | Trumbull et al. | 411/903 X |
| 3,618,444 | 11/1971 | Kay et al. | 85/9 |
| 3,693,495 | 9/1972 | Wagner | 85/9 R |
| 3,897,712 | 8/1975 | Black | 85/9 R |
| 4,154,138 | 5/1979 | Melone | 85/1 JP |
| 4,373,842 | 2/1983 | Bettini et al. | 411/903 X |
| 4,717,302 | 1/1988 | Adams et al. | 411/378 |
| 4,887,951 | 12/1989 | Hashimoto | 411/371 |
| 4,948,318 | 8/1990 | Nottelmann et al. | 411/377 |

FOREIGN PATENT DOCUMENTS

| | | | |
|---|---|---|---|
| 1408532 | 10/1975 | United Kingdom | 411/377 |
| 2184187 | 6/1987 | United Kingdom | 411/371 |

*Primary Examiner*—Rodney M. Lindsey
*Attorney, Agent, or Firm*—Fitch, Even, Tabin & Flannery

[57] ABSTRACT

A threaded fastener is provided with a plastic head section that is interlocked with a metal head end of a metal body having an elongated shank with a thread thereon. The plastic head is polygonal with a higher concentration of a reinforcing filler material such as glass in the outer periphery of the polygon so that the plastic head can be turned with the usual wrenches at a normal turning torque without rounding off of the polygonal corners of the head. The inner section of the plastic head has a lesser concentration of filler material adjacent the juncture of plastic and the metal head end to provide greater ductility and strength resistance to fracture or separation of the plastic from the metal head end. The preferred fastener has a self-tapping, helical screw thread thereon and a plurality of metal washers for receiving and separating electrical conductors that will be attached to the fastener between adjacent washers. The edges of the washers are also coated with plastic having a lesser concentration of the filler material thereby providing greater ductility and more resistance to cracking or chipping of the plastic from the washer edges. The preferred plastic is nylon. A method of molding the plastic with the filler material in a plastics mold is disclosed.

3 Claims, 1 Drawing Sheet

U.S. Patent  June 16, 1992  5,122,021
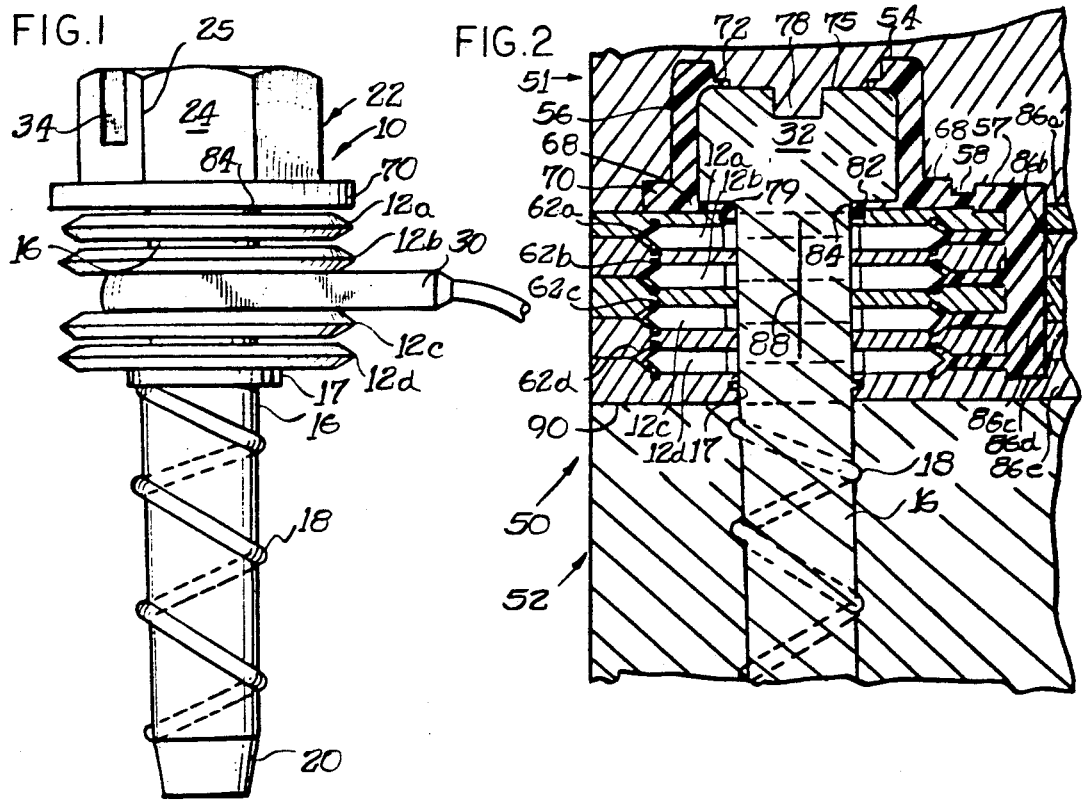
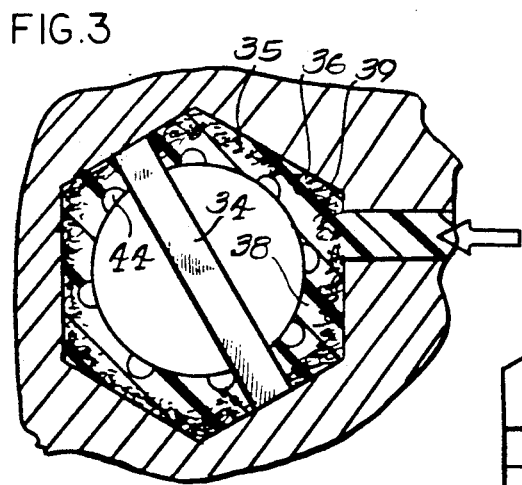
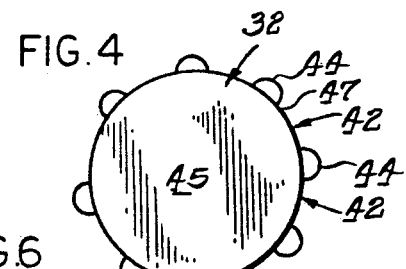
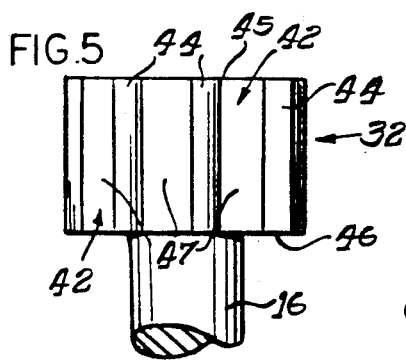
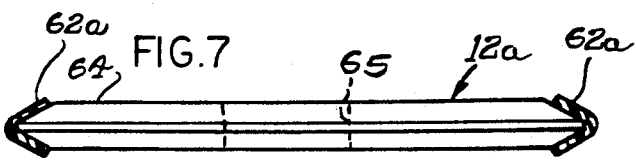

ENCAPSULATED FASTENER AND WASHER

BACKGROUND OF THE INVENTION

This invention relates to a metal threaded fastener having insulating plastic thereon and to a method and apparatus for making the same.

The present invention will be described in connection with a preferred embodiment in the form of electrical connector fastener which has a head substantially encapsulated in a plastic and which has metal washers with peripheral edges thereof covered by plastic and disposed on the upper portion of the shank of the fastener. The lower portion of the fastener is threaded, usually with a self-threading, spiral screw thread. The outer edges of the washers are coated with plastic while inner metal contact surfaces on adjacent washers contact wire clips or wraps of wire to establish an electrical connection between the conductors and the inner metal contact surfaces of the washers. Usually, the head of the fastener is provided with a slotted head to be driven by a screwdriver.

These self-threading, electrical terminal screws have not heretofore been manufactured with polygonal driving heads because this plastic head section should have substantially the same strength as a standard metal fastener without the plastic with respect to being driven by a power tool or manual wrench. This is difficult because as the plastic tends to tear away or separate from the metal head at the high torques applied to the screw head with a hexagonal-headed tool or the plastic corners shear or become "rolled over" or rounded off so that the tool cannot turn the head.

A number of hybrid plastics have been molded to metal screw head ends without great commercial success because the plastic tends to separate from the metal or the corners of plastic head tend to round off. Another problem is that if one tries to make the plastic for the head too hard or too brittle to increase corners of the plastic heads in resisting deformation or shearing into the rounded off configuration at high torque loads, then the plastic has a tendency to be brittle and to crack or to chip at the thin outer layer on the edges of the metallic washers.

Thus, it is an object of the present invention to provide a new and improved threaded fastener of the foregoing kind with an improved plastic head resistant to tearing away from the metal fastener and to rounding off at the corners at normally applied torques.

Another object of the invention to provide a plastic head portion that is stronger and less ductile than the encapsulated edges of the washers on the fastener so that the more ductile edges of the washers not chip or crack away from the metal edges on the washers.

A still further object of the invention is to provide a method and apparatus for the manufacture of this improved fastener.

SUMMARY OF THE INVENTION

A metallic screw is provided with a driving head end encapsulated in a plastic that is reinforced with a reinforcing material that is concentrated in the outer periphery and corners of the plastic drive head to make the corners substantially harder and more resistant to roll over or shearing when driven by a tool. The strength of the plastic head is such that it withstands the torque drive from a tool socket or wrench which is driving the fastener with the usual torque needed to thread the fastener into a substrate. For example, the head will withstand a 20 inch pound torque to self-thread a No. 6 self-threading screw into a substrate. At least one and usually several washers on the shank of the screw have their thin outer annular edges coated with the plastic with little or no reinforcing material at these thin edges so that the edges are substantially more ductile than the reinforced plastic corners of the driving head. The preferred head end of the metal screw is shaped to interlock with the plastic. The preferred plastic is a nylon, and the preferred reinforcing material is glass.

In the molding of the glass-filled nylon onto the fluted head end of the screw, a relatively larger space exists in the mold between the metal fluted head end and the outer portions of the die cavity which will form the sides of the hexagonal head of plastic on the fastener. The injected nylon travels faster than the heavier glass reinforcing material with the result that the reinforcing glass concentrates along the outer edge portions of the plastic screw head. Thus, the reinforcing glass is located where it is desired, i.e., at the sides and corners of the hexagonal head, and the glass is harder and stronger than the plastic so that the glass-reinforced corners resist deformation and shear by a torque tool applied to the screw head and its corners. Thus, a plastic encapsulated head on a threaded fastener may be molded onto a metal by a method of concentrating reinforcing material in the plastic at the outer edges and corner locations to make the corners stronger. There will be less concentration of glass reinforcing material at and adjacent to the interface between the metal head end and the plastic mated therewith. Hence, the plastic head portion will be more ductile at the interface with the metal head end than the outer plastic head portion. Also, a substantial reduction of the reinforcing material at the thin washer edges results in a more ductile plastic material covering the edges of the washers. As a result, there is less tendency for these more ductile edges to crack or chip than would be the case if the more brittle reinforcing material were concentrated more substantially at these edges.

BRIEF DESCRIPTION OF THE DRAWINGS

Turning now to the illustrated and preferred embodiment of the invention which is illustrated in the accompanying drawings and in which:

FIG. 1 is an enlarged view of a fastener having a plastic encapsulated head with the outer sides and corners of the driving head reinforced with a high concentration of reinforcing material.

FIG. 2 is a view showing the encapsulated fastener of FIG. 1 in a plastic mold.

FIG. 3 is a plan view of the metal head end and of the mold of FIG. 2.

FIG. 4 is a plan view of the head of the steel fastener body before encapsulation.

FIG. 5 is a partial, side elevation view of the steel fastener body before encapsulation.

FIG. 6 is a plan view of the fastener of FIGS. 1 and 2 with a molded plastic hexagonal head thereon.

FIG. 7 is a view of the washer encapsulated with a more ductile plastic outer edge because of a reduced amount of reinforcing material at the outer edge of the washer.

DETAILED DESCRIPTION OF THE PREFERRED EMBODIMENT

As shown in the drawings for purposes of illustration, the invention is embodied in a threaded fastener 10 preferably of the electrical connector-type of fastener having a plurality of washers 12a, 12b, 12c and 12d mounted or an upper portion 14 of a shank 16 for the fastener. The shank has an integrally-formed helical thread 18 wound about the shank for self-threading into a workpiece. A small collar 17 on the shank is positioned beneath the lowermost washer 12d to hold the washers from sliding off the shank. The collar 17 is located above the upper end of the helical screw. The lower end of the shank has a smaller diameter, pilot end 20 that is inserted into a workpiece and then driven by a power tool or a manually-operated tool connected to an upper driving head 22 for the fastener. Heretofore, if the head of the screw was encapsulated with plastic, it could only be driven by a screw drive end of a tool that fitted into a screw drive-receiving slot 34 at the top end of the screw fastener. The driving head may take different shapes but it is usually in the form of a polygonal head, usually hexagonal. Heretofore if the driving head was made of plastic and a hexagonal socket or a wrench was applied with a turning torque when engaging flats 24 and corners 25 of the driving head, the plastic would fracture or round off corners 25 on the driving head. The illustrated fastener is an electrical connector type of fastener that includes the plurality of washers or spacers 12a-12d that are or will be spaced from each other by interposed conventional wire connector clip 30 or wrap of wire.

Heretofore, the encapsulated driving heads 22 of the fasteners did not have a hexagonal driving head for a hexagonal tool or a wrench but only had the slot 34 or other shaped groove in the head for receiving a screw driver tool which applied the torque to drive the fastener at the slot 34. The usual plastic would be an ABS plastic, a polyester plastic, a nylon plastic, or a hybrid plastic. A need existed for a fastener of this kind having a polygonal shaped head to be driven by a polygonal tool or a wrench in the manner that all metal head screws of this kind are driven. For instance, when a plastic encapsulated head of hexagonal configuration was tried to be molded to a screw head of a No. 6 self-threading screw, as illustrated herein, and when 20-inch pounds of torque was tried to be applied by a hexagonal socket driver (not shown) to cause the self-threading screw thread to, screw into a substrate, the corners 25 of the plastic head "rolled over" or "rounded off" so that the tool could no longer be effective in driving, and the tool could not be used in a reverse direction to remove the fastener.

In other instances, the plastic in the head broke or tore away from the metal head end 32 when typical torque loadings used to turn all metal screws where applied. Thus, there is a need for an encapsulated self-threading screw having the same general configuration and size of a conventional metal headed screw.

In accordance with the present invention, there is provided a new and improved fastener 10 having an encapsulated driving head 22 of polygonal shape which has sufficient strength to be driven by a wrench or tool to thread the fastener into a substrate. This is achieved by molding the plastic head section 35 with a filled plastic having reinforcing material such as glass, 39 concentrated in outer areas or portions 36 of the driving head 22 to give it greater strength against a roll over or a rounding off of the corners 25 when the designated torque is applied to thread the fastener, e.g., 20-inch pounds of torque for a No. 6 self-threading screw. The concentration of glass in in the outer portion 36 provides a harder, stronger and more brittle outer plastic head portion 36 than an inner plastic head portion 38 which has substantially less reinforcing material in it than there is reinforcing material in the outer portion 36. Because of this reduction in reinforcing material, the inner portion 38 has greater ductility than the outer portion 36 and is not as brittle and does not tend to break at or adjacent to the metal head end 32 of the fastener, as is the case when the reinforcing material is at a high concentration adjacent the metal head.

The preferred metal head end for the fastener 10 is configured to mechanically interlock with plastic head section 35. The preferred interlocking shapes are grooves 42 between adjacent flutes 44 on the metal head end.

Turning now in greater detail to the illustrated embodiment of the invention, the metal head end 32 is configured to interlock with the plastic head section 35 and the illustrated metal head end 32, is relatively round in cross section except for spaced flutes 44 which are rounded ribs spaced about the circumference of the driving head end. The plates 44 extend vertically the full height of the head between an upper, flat head surface 45 at the top of screw and a lower horizontal, flat surface 46 at the bottom of the head end where the head end is integrally joined to the top of the shank 16. Herein, eight such flutes or ribs project outwardly from inner groove walls 47 which define the inner sides of the grooves 42 between adjacent flutes. The preferred flutes have a rounded outer side wall. Manifestly, other interlocking shapes between the plastic head section 35 and the metal head end 32 may be used.

The preferred plastic material is nylon although other plastic materials may be used. For example, an ABS plastic, or a polyester plastic may be used with an appropriate reinforcing material. The preferred reinforcing material is glass, although other reinforcing materials that are denser or more heavy than the plastic are usable. It is thought that the nylon plastic flows faster under the very large injection molding pressures and that the heavier and denser glass particles, which are often termed fillers, travel at a slower velocity and are forced to go to the outside regions of the head.

The preferred plastic material has a glass fill content of 20 or 30% by volume to give the desired concentration and strength and hardness to the head. A glass fill content of 10% or less did not provide as good strength or hardness qualities as did the 20 or 30% glass filled plastic. At above 30% glass fill, the head becomes more brittle and hence more fragile and may break. These glass filled nylon plastic materials are available from a number of commercial vendors.

The preferred method of making the illustrated fastener 10 is by molding the plastic in an injection molding apparatus that includes a split mold 50 that includes an upper mold half or section 51 and a lower mold half or section 52. The slotted head end 32 of metal is position in an upper cavity 54 in the upper mold half with the sides 56 of the mold cavity spaced at about 0.020 at the flats 24 and with the mold sides 56 at the corners 25 spaced at about 0.030 to 0.035 inch from the metal head. Herein, for a No. 6 self-tapping screw the metal head end has a diameter of between 0.210 and 0.215 inch. In the illustrated mold, the plastic with its glass filler is injected through a runner 56 and upper gate 58 into the mold cavity with the higher velocity plastic moving more quickly about the metal driving end and the denser glass following and concentrating in the outer area or head section 36. The runner simultaneously is supplying plastic and the glass fillert to the four lower gates 60 each leading to washer mold cavities 62a, 62b, 62c and 62d. The respective washers 12a–12d are in an associated cavity. The injected plastic flows through the lower gates into the washer cavities. Because the washer edges are spaced about only 0.010 inch from the mold walls, very little plastic is needed to fill these washer cavities and it is the faster moving nylon with little of the denser glass filler that fills the washer cavities. Thus, the washer edges are covered with a more ductile substantially all nylon plastic layer. As best seen in FIG. 7, the metal interior annulus 64 of each washer is uncoated with plastic and will have a metal-to-metal contact with a connector wire or clip 30. A large central opening 65 is provided in each washer and is sized closely to the diameter of the fastener shank 16. The screw thread 18 has a larger outer diameter than the diameter of the washer opening so that washers will not slide freely from the upper portion of the shank and from the screw. The upper shank diameter is smaller so that the washers slide freely on the upper end of the shank.

The illustrated mold also includes a lower flange cavity 68 that forms an annular flange or collar of plastic flange 70 projecting radially outwardly from the lower skirt edge on the plastic head section 35. At the top of the mold cavity is a small internal flange 72 projecting radially inwardly over the top of the metal head section. The plastic head section 35 has an upper and outer edge portion projecting above the top surface of the metal head end 32. The central portion of the upper surface of the metal head end is exposed metal at a central, circular area 75 which is split by the slot 34 for the screw driver. The upper mold half has a depending bar 78 that fits into the slot 34 in the metal head end and prevents any plastic from entering into the slot. The metal bar extends across the full width of the cavity so that the ends of the slot remain open and uncovered by the plastic being molded onto the metal head end. In the preferred and illustrated fastener, the underside of the metal head is coated with a plastic layer 79 which fills a small radially-inward cavity section underlying the metal head. A very small annular, downwardly-extending cavity section 82 in the mold about the upper end of shank allows the molding of a very small collar 84 of plastic immediately below the layer 79. The collar has a larger diameter than the washer opening 65 and hence spaces the upper washer 12a from the plastic layer 79 on the bottom of the metal head.

The illustrated mold includes a plurality of split slides 86a, 86b, 86c, 86d and 86e that slide horizontally from each other at a vertical parting line 88. The top mold half moves upwardly from a parting horizontal line 90 with the upper slide 86a. No plastic is applied to the lower portion of the shank, which is received int he lower mold half 52.

From the foregoing, it will be seen that there has been provided a new and improved fastener having a molded plastic head with a reinforced outer edge on the polygonal-shaped head with a reinforced outer edge on the polygonal-shaped head to resist shearing or rounding off of the corners, and with a more ductile inner plastic joining the plastic head section to a metal head end. While the fastener may be made without washers and fall within the purview of the invention, the preferred embodiment has washers thereon and these have their outer edges coated with a more ductile plastic because of having less of the reinforcing filler material therein than does the outer edges of the polygonal-shaped head.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed:

1. A threaded fastener comprising:
 a metal body having an upper head end and an elongated shank,
 a thread on the shank for threading into a material when a predetermined torque is applied to the head end of the metal body,
 an electrical insulating plastic head of plastic and having a polygonal shape molded on the upper head end of the metal body,
 an inner section of the plastic head joined to the metal head end of the metal body and having a first predetermined strength property, and
 an outer section of the plastic head having the polygonal shape and formed with greater resistance to shear and rounding off of the corners of the polygonal shape when a tool is applied to thread the fastener into a material, the plastic head being formed with a plastic having a reinforcing filler material therein, a larger concentration of the filler material being provided at the outer section of the plastic head than at the inner section of the plastic head.

2. A threaded fastener in accordance with claim 1 in which the plastic is nylon and the filler material is glass.

3. A threaded fastener comprising:
 a metal body having an upper head end and an elongated shank,
 a thread on the shank for threading into a material when a predetermined torque is applied to the head end of the metal body,
 an electrical insulating plastic head of plastic and having a polygonal shape molded on the upper head end of the metal body,
 an inner section of the plastic head joined to the metal head end of the metal body and having a first predetermined strength property,
 an outer section of the plastic head having the polygonal shape and formed with greater resistance to shear and rounding off of the corners of the polygonal shape when a tool is applied to thread the fastener into a material,
 at least one metal washer mounted on an upper end of the shank beneath the plastic had,
 a plastic layer on the outer peripheral edge of the washer having properties more similar to those of the inner head section than the outer head section to reduce cracking or chipping of the plastic layer, the thread being a self-tapping helical thread on the metal screw body, and
 a plurality of washers mounted on the upper end of the shank with the screw thread, and a collar on the shank having a diameter larger than an opening in the lowermost washer retains all the washers on the shank above the screw thread.

* * * * *

UNITED STATES PATENT AND TRADEMARK OFFICE
CERTIFICATE OF CORRECTION

PATENT NO. : 5,122,021
DATED : June 16, 1992
INVENTOR(S) : James Medal

It is certified that error appears in the above-indentified patent and that said Letters Patent is hereby corrected as shown below:

Column 1, Line 29, delete "as".

Column 1, Line 50, after "invention" insert --is--.

Column 1, Line 53, after "washers" insert --do--.

Column 2, Line 61, change "elevation" to --elevational--.

Column 3, Line 8, change "or" to --on--.

Column 3, Line 51, change "off'" to --off"--.

Column 3, Line 57, change "where" to --were--.

Column 3, Line 67, after "glass" delete the comma.

Column 4, Line 5, delete second occurrence of "the".

Column 4, Line 24, after "32" delete the comma.

Column 4, Line 27, change "plates" to --flutes--.

Column 4, Line 29, after "of" insert --the--.

UNITED STATES PATENT AND TRADEMARK OFFICE
CERTIFICATE OF CORRECTION

PATENT NO. : 5,122,021
DATED : June 16, 1992
INVENTOR(S) : James Medal

It is certified that error appears in the above-indentified patent and that said Letters Patent is hereby corrected as shown below:

Column 4, Lines 62-63, change "position" to --positioned--.

Column 5, Line 7, change "fillert" to --filler--.

Column 5, Line 49, after "of" insert --the--.

Column 5, Line 59, change "int he" to --in the--.

Column 5, Lines 64-65, after "head" delete "with a reinforced outer edge on the polygonal-shaped head".

Column 6, Line 56, change "had" to --head--.

Signed and Sealed this

Fourth Day of January, 1994

Attest:

BRUCE LEHMAN

*Attesting Officer*  *Commissioner of Patents and Trademarks*